United States Patent
Göcke

(10) Patent No.: US 7,967,226 B2
(45) Date of Patent: Jun. 28, 2011

(54) DRYING MILL AND METHOD OF DRYING GROUND MATERIAL

(75) Inventor: Volker Göcke, Kakerbeck (DE)

(73) Assignee: Claudius Peters Technologies GmbH, Buxtehude (DE)

( * ) Notice: Subject to any disclaimer, the term of this patent is extended or adjusted under 35 U.S.C. 154(b) by 475 days.

(21) Appl. No.: 11/989,389

(22) PCT Filed: Jul. 25, 2006

(86) PCT No.: PCT/EP2006/007301
§ 371 (c)(1),
(2), (4) Date: Nov. 3, 2008

(87) PCT Pub. No.: WO2007/012452
PCT Pub. Date: Feb. 1, 2007

(65) Prior Publication Data
US 2009/0101741 A1  Apr. 23, 2009

(30) Foreign Application Priority Data

Jul. 25, 2005 (EP) .................................... 05016107

(51) Int. Cl.
*B02C 13/00* (2006.01)
*B02C 17/02* (2006.01)
*B02C 23/12* (2006.01)
(52) U.S. Cl. ........................... 241/80; 241/119; 241/275
(58) Field of Classification Search .................. 241/275, 241/119, 79.1, 80
See application file for complete search history.

(56) References Cited

U.S. PATENT DOCUMENTS

| 4,398,673 A | 8/1983 | Gonnason |
| 4,860,962 A * | 8/1989 | Kiefer et al. .................. 241/117 |
| 5,004,082 A | 4/1991 | Haas et al. |
| 5,275,631 A | 1/1994 | Brown et al. |

FOREIGN PATENT DOCUMENTS

| EP | 0 325 770 A | 8/1989 |
| EP | 0 513 779 A | 11/1992 |
| EP | 1 072 854 A | 1/2001 |
| GB | 352 443 A | 7/1931 |
| JP | 57 087852 A | 6/1982 |

* cited by examiner

*Primary Examiner* — Bena Miller
(74) *Attorney, Agent, or Firm* — Alix, Yale & Ristas, LLP

(57) ABSTRACT

A drying mill for powdered or fine-grained material, in particular also suitable for calcining gypsum, employs a housing, in which a feed device for fuel gas, opening into a lower region, a comminuting device and a material inlet, charging the material onto the comminuting device from above, are provided one above the other, a material outlet leading to the outside from an upper region of a working chamber and a return leading downwards to the comminuting device, the comminuting device being a centrifugal disc which rotates in a horizontal plane and interacts with an impact casing arranged on the inside of the housing. A nozzle ring surrounding the centrifugal disc from below is provided for feeding fuel gas into the working chamber. As a result, the calcining process in particular is assisted in an efficient way by utilizing the thermal energy of the hot gas fed into the working chamber by means of the nozzle ring and the dwell time in the working chamber. A corresponding comminuting method is provided.

13 Claims, 2 Drawing Sheets

DRYING MILL AND METHOD OF DRYING GROUND MATERIAL

BACKGROUND

The disclosure relates to a drying mill for coarse-grained or fine-grained material, especially also suitable for calcining gypsum, with a housing in which a feed device for a propelling gas, which leads to a lower region, and a comminuting device, are arranged one above the other.

Mills with drying function are especially used in plants for calcining gypsum. The raw material must be comminuted before burning. A calcining plant, therefore, has a grinding device as the essential component. That applies especially in the case of processing recycled gypsum, like REA gypsum, as source material.

Drying mills, which are based on a ball and ring mill, are known from prior public use. They are marketed for example by Claudius Peters Technologies under the designation EM mill. It has a grinding device which comprises a plurality of large grinding balls which run on a grinding track. During operation, the ground material is discharged outwards, and gathered and dried there by a rising propelling gas until it reaches a sifter which is arranged vertically above the grinding device. Oversized particles cannot be transported upwards by the propelling gas stream, but fall back onto the grinding track. The material which reaches the sifter is separated into a fine fraction and a coarse fraction, wherein the coarse fraction is guided back into the grinding device via guides. The fine fraction is separated out and discharged from the mill. These mills certainly deliver very good results and are extremely stable, but are not suitable for processing all raw materials. Such materials, which can be comminuted better by breaking up than by crushing, as when grinding, can cause difficulties. Also, the energy expenditure for driving the heavy grinding gear is rather high.

For processing such materials, with which comminuting is essentially defined by a disintegrating of agglomerations, another type of construction has been known. In this case, such a type of construction concerns a hammer mill. It is marketed for example under the designation Delta Mill by Claudius Peters Technologies. It has a hammer grinding gear and a sifter gear which is arranged next to it on the same drive shaft. The material which is fed from one side to the hammer grinding gear is ground, and further transported by a propelling gas stream into the sifter gear. The sifter gear comprises paddles which reject oversized particles and transfer only fine particles to an outlet. Such hammer mills are certainly suitable for processing material which is not to be processed, or processed only with difficulty, by the ball and ring mill, but also have disadvantages. Hammer mills are sensitive to foreign bodies, and they are susceptible to wear on account of the movable hammer elements. Furthermore, they take up a comparatively large amount of room on account of the horizontal position of the drive axis for the hammer grinding gear.

Starting from the first-named type of construction, an object is to create a mill with drying function, which with high stability is less costly, and also to provide a corresponding operating method.

SUMMARY

With a drying mill for powdery or fine-grained material, especially also suitable for calcining gypsum, with a housing which encloses a working chamber and in which a feed device for a propelling gas, which leads to a lower region, a comminuting device and a material inlet are provided one above the other, which material inlet feeds the material from the top onto the comminuting device, wherein a material outlet leads outwards from an upper region of the working chamber, and a return passage leads downwards to the comminuting device, wherein the comminuting device is a centrifugal disk which rotates in a horizontal plane and interacts with an impact casing which is arranged on the housing on the inside. A nozzle ring, which encompasses the centrifugal disk from the bottom, is provided for feeding propelling gas into the working chamber.

One feature is the functional interaction of the centrifugal disk and the nozzle ring, wherein the centrifugal disk serves as a comminuting device by which the material which is to be comminuted is centrifuged against an impact casing, as a result of which the material maintains a high impulse which leads both to disagglomeration as well as to movement of the fragments in a stochastically distributed manner; wherein propelling gas is additionally fed in a directed manner into the working chamber through the nozzle ring, which encompasses the centrifugal disk from the bottom, in order to already fluidize the fragments in direct proximity to the centrifugal disk by means of the propelling gas in this way and to move the fragments upwards in the direction of the material outlet. Large and therefore heavy particles cannot follow, but fall back onto the centrifugal disk by which they are again centrifuged and comminuted. The return passage does not absolutely need to be constructed as a separate structural element, but the particles can even fall back through the free space by gravity alone. In this way, a type of circulating comminution takes place in the working chamber, during which drying can be carried out by means of the propelling gas stream at the same time. The material is reliably comminuted if it ultimately reaches the material outlet. Consequently, the mill has an inner return passage which manages without separate components and achieves a high degree of comminution in an almost wear-free manner. The robustness with respect to foreign bodies is high, since there are no parts which run onto each other and which could be blocked by foreign bodies. The construction is less costly and the operation only requires little energy, since only the comparatively light centrifugal disk needs to be driven. As a result, in an amazingly simple manner, the noted features combine advantages with regard to simple construction and favorable operation with low wear.

It is expedient to arrange the motor, which is provided for driving the centrifugal disk, outside the working chamber. This ensures good access for maintenance purposes and protects the motor against wear as a result of grinding dust. Furthermore, simpler and better cooling results compared with an arrangement inside the working chamber. In addition, the centrifugal disk is advantageously supported via an air bearing. This ensures not only a low-friction operation, but also provides a high resistance to wear as a result of grinding dust. Moreover, the dispensing with a lubricated bearing simplifies maintenance. The impact casing is expediently constructed in a multi-sectioned manner, with a plurality of segments. The segments are wearing parts. With such a multi-sectioned construction, they can be individually exchanged when required. Moreover, handling is made easier.

For protecting the environment against grinding dust, it is favorable to provide a negative pressure connection. In this way, the drying mill can be charged with negative pressure so that an occurrence of grinding dust can be prevented. A negative pressure in the range of −15 mbar to −3 mbar has proved to be favorable. For feed of the material, a pressure lock is expediently provided at the material inlet.

The propelling gas, which is fed via the nozzle ring into the working chamber, can preferably be fed at increased temperature (as so-called hot gas) for increasing the drying action. The temperature of the supplied hot gas is preferably within the range of between 100 and 400° C., if drying of the comminuted material is primarily to be achieved; it is preferably within the range of between 500 and 700° C. if, over and above drying, calcining of the comminuted material is also already to be achieved. In order to especially properly control the calcining process, the hot gas feed stream into the mill must be correspondingly regulated. For this purpose, the nozzle ring is expediently provided with an adjusting device in the form of an adjustable air gap which adjusts or limits the throughflow velocity of the hot gas through the nozzle ring. As a result of feeding the hot gas by means of the nozzle ring, a feature is developed in an especially expedient manner in such a way that the course of the process, especially of a calcining process, can be influenced via the temperature and also the throughflow velocity of the hot gas. In this way, the calcining can already be carried out during comminuting, wherein on account of the circulating operation an especially long contact time, and consequently energy utilization, can be achieved. The mill can therefore function as a prereactor.

For protecting the impact casing, and, if applicable, the nozzle ring, against foreign bodies, a strainer basket can be provided on the edge of the centrifugal disk. The strainer basket prevents passage of the foreign bodies and of excessively heavy fragments. The risk of damage or blockages is counteracted by this.

In an especially expedient embodiment, a sifter is arranged in the upper region of the working chamber and separates a coarse fraction of the material which rises from the centrifugal disk for return to the centrifugal disk. The sifter in this case can be a static sifter or a dynamic sifter. It improves the classification of the ground material into coarse and fine fractions. Moreover, it assists and boosts the circulating operation and consequently brings about an increase of the comminution quality. The comminution quality which is achieved can be directly influenced by the adjustment of the sifter. With dynamic sifters, this can easily be carried out by a change of the circulating velocity.

A downwards pointing return passage, which extends from the sifter, is preferably provided, through which the coarse fraction is transported by means of gravity force to the centrifugal disk. In this way, a controlled path for the coarse fraction which is separated by the sifter is ensured in the working chamber. This achieves the effect of the coarse fraction first striking the centrifugal disk and being comminuted once again before it rises again to the sifter. The return passage preferably leads to the proximity of the material inlet, so that the coarse fraction mixes with newly fed material, and not with the ground material.

According to a method, during comminuting of powdery or fine-grained material, especially gypsum, comprising feeding the material, feeding the material onto a comminuting device from the top, comminuting the material by means of horizontal centrifuging of the material against an impact casing, upwards moving of the comminuted material by means of a propelling gas stream and discharging the comminuted material, as well as repeating the centrifuging by return of larger components by means of gravity force, it is provided that the propelling gas is fed via a nozzle ring and calcining of the material is carried out in the propelling gas stream. By the propelling gas stream, which can be a hot gas flow, which is fed by means of the nozzle ring to the working chamber, not only transporting of the comminuted material is brought about, but drying, especially calcining, can also be brought about.

The propelling gas is fed in a heated state, or is mixed with heated gas. The propelling gas which is thus temperature conditioned is referred to as hot gas. By feeding the hot gas from the bottom into the working chamber via the nozzle ring, the thermal convection is better utilized. A favorable temperature is within the range of 500 to 700° C. Moreover, the temperature of the calcining in the reactor, and that of the material when leaving via the material outlet, can be regulated, especially in conjunction with regulating the propelling gas stream by means of the air gap which is provided for the nozzle ring.

The ground material is preferably classified by means of a sifter which is arranged in the upper region of the reactor. Classifying can be carried out by means of a static sifter, or preferably a dynamic sifter. In this case, the centrifugal disk is expediently driven from the outside. In this way, the drive is protected against adverse effects by the material.

During operation, the reactor is expediently charged with negative pressure. The risk of an unwanted escape of ground material, especially as a result of leakages, is consequently counteracted. A negative pressure in the region of −15 mbar to −3 mbar has proved to be favorable. The feed of material to it is expediently carried out via a pressure lock.

For more detailed explanation, the above-mentioned description of the drying mill is referred to.

DETAILED DESCRIPTION OF THE PREFERRED EMBODIMENTS

Figure 1:
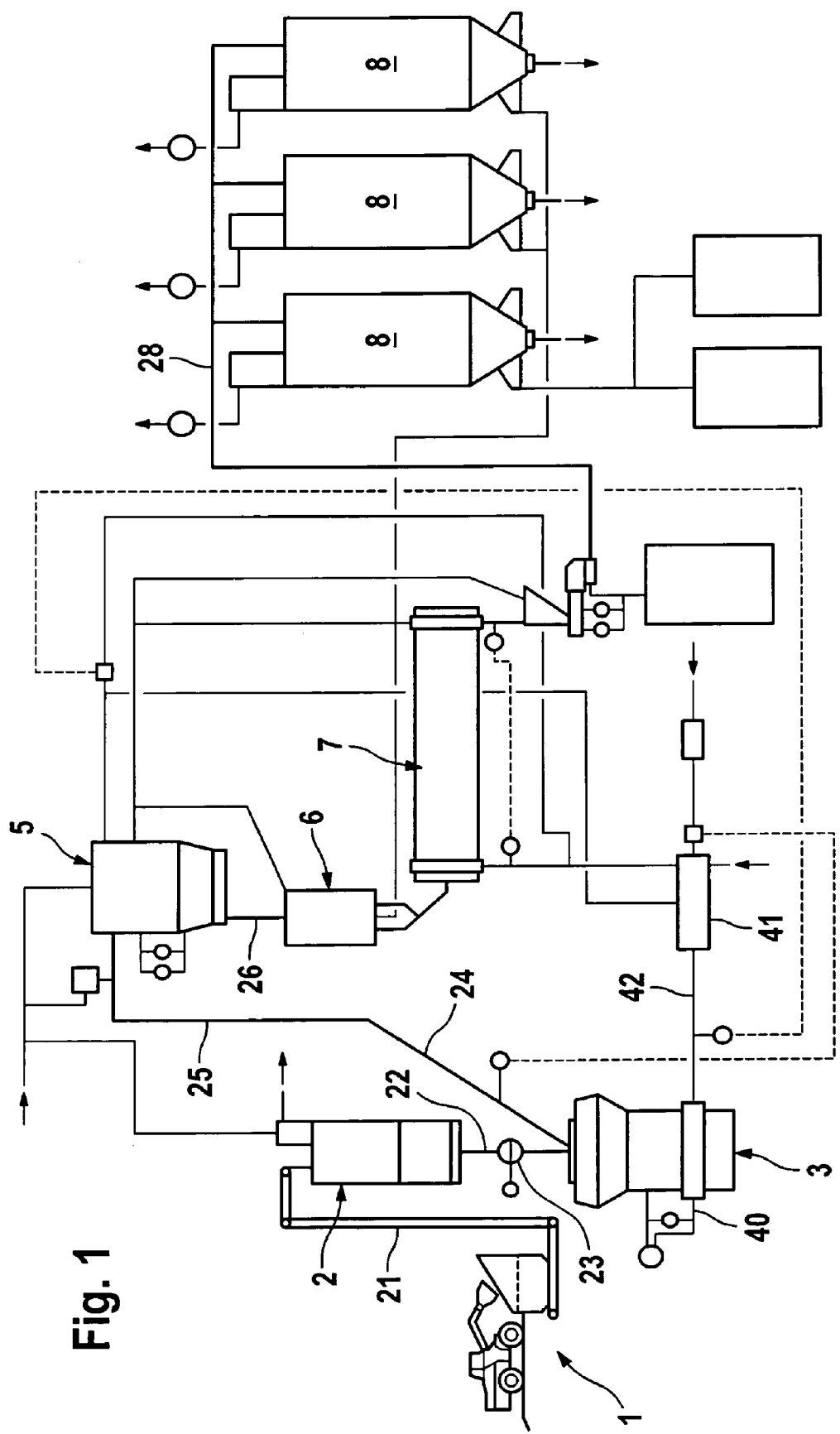
FIG. 1 shows a schematic overview representation of a calcining plant.

Reference is first made to FIG. 1. It shows the integration of the drying mill into a calcining plant and further serves for illustrating the method implementation.

Raw material is introduced into the calcining plant at a feed point 1. The raw material can especially be recycled gypsum products, such as plaster building boards and also so-called REA gypsum from flue gas desulphurization plants. The invention is especially suitable for these, as for other types of synthetic gypsum, such as phosphor gypsum. From the feed point 1, the gypsum raw material reaches a storage silo 2 by means of a suitable transporting device 21. This storage silo is arranged in an elevated manner and is located above, even if not absolutely exactly above, a drying mill 3 according to the invention. The raw material reaches a pressure lock of the drying mill 3 via a downpipe 22 with a control slide 23 by means of gravity force. A propelling gas source, which comprises a hot gas generator 41 which is connected via a feed line 42 to a nozzle ring 45, is additionally connected to the drying mill. A connection 40 is additionally provided for charging the drying mill 3 with negative pressure. The construction and the principle of operation of the drying mill 3 are described in more detail later.

The now ground gypsum leaves the drying mill 3 via a riser pipe 25 and reaches a filtering plant 5. From there, it is transported via a line 26 to a further treatment stage 6 and transported on to a feed end of a rotary cooler 7. There, the gypsum is fed for cooling. The cooled and burnt gypsum is subsequently directed via distribution lines 28 into storage silos 8. From these, it can be extracted when required.

Figure 2:
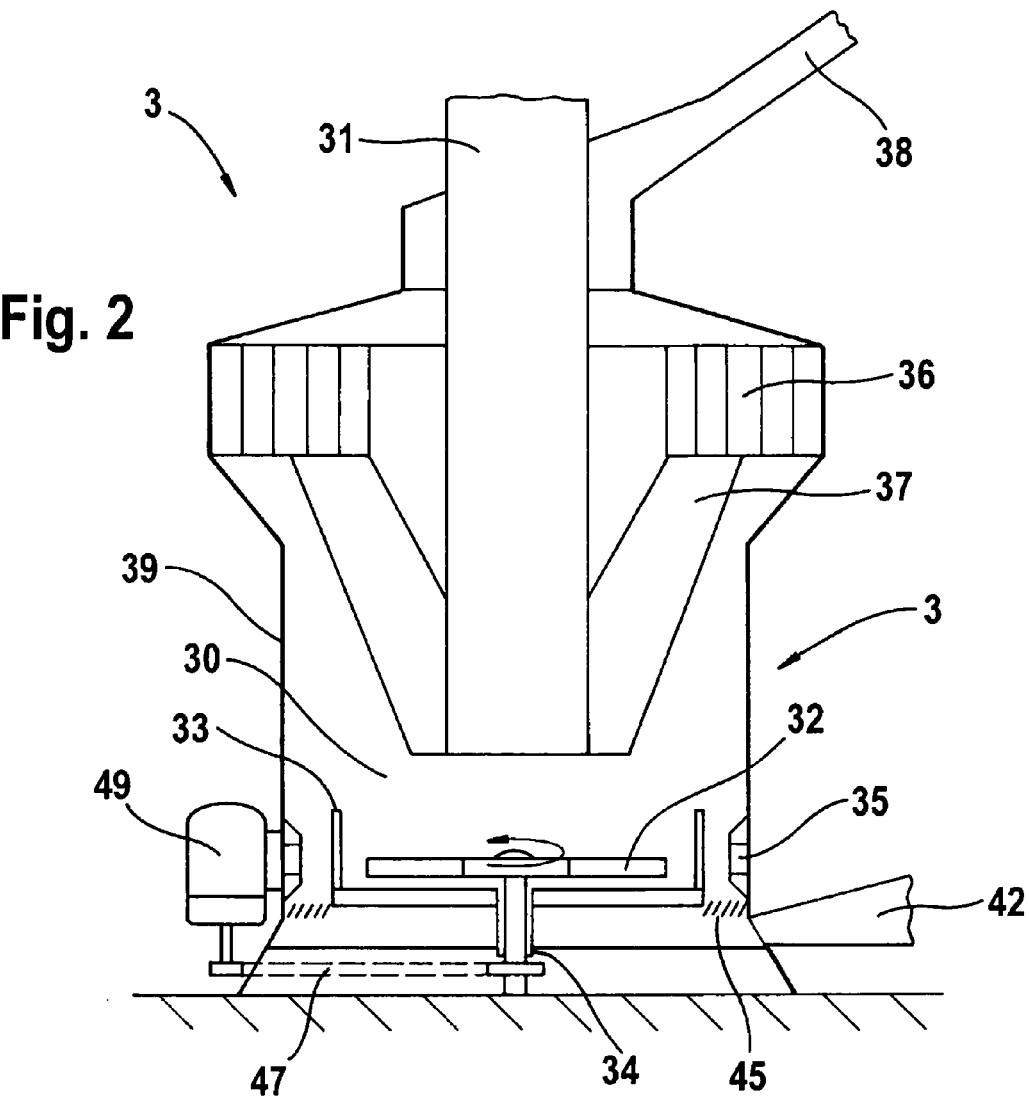
FIG. 2 shows a sectional view of an exemplary embodiment of a drying mill.
Figure 3:
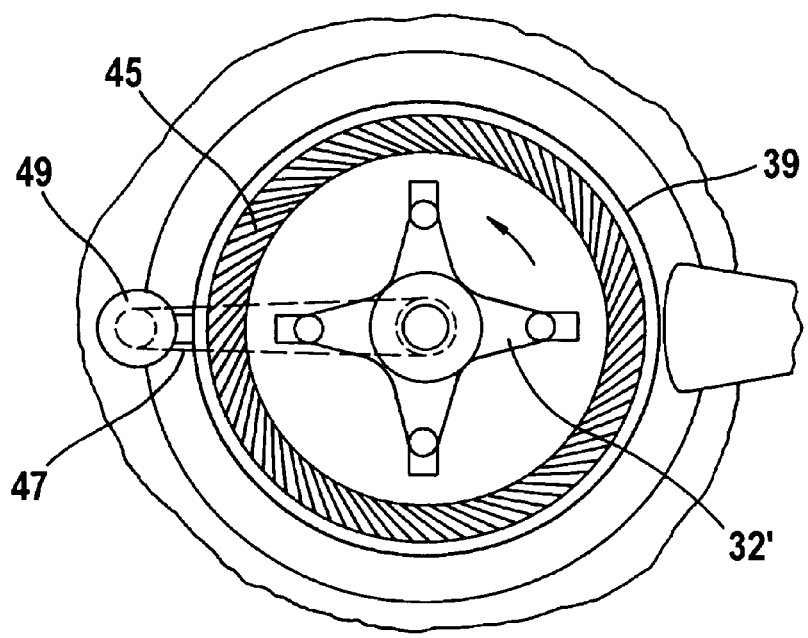
FIG. 3 shows a top view of a centrifugal disk of the drying mill which is shown in FIG. 2.

Reference is now made to FIG. 2. The gypsum reaches the drying mill 3 via the pressure lock (not shown). The pressure lock serves for maintaining the negative pressure in the drying mill 3. The pressure lock merges into a material inlet 31 which, inside the drying mill 3, leads into a working chamber 30. The material inlet 31 ends in a centrally arranged downpipe which extends vertically from top to bottom in the working chamber 30. From this downpipe, the raw material gypsum falls directly from the top onto a centrifugal disk 32 which is centrally arranged directly beneath it. In order to avoid an unsymmetrical feed of the raw gypsum, the material inlet 31 opens exactly above the middle of the centrifugal disk 32. A centrally arranged cone (not shown) can be provided between the mouth of the material inlet 31 and the centrifugal disk. The cone serves for evenly distributing the incoming raw material over the centrifugal disk 32.

The centrifugal disk 32 is connected via a belt transmission 47 to a drive motor 49. For protecting against adverse effects of grinding dust and for better cooling and also for easier maintainability, the motor is arranged outside the working chamber 30 on the housing wall 39. In order to further reduce the maintenance cost, a shaft drive with an angular gear can also be provided. The drive motor 49 is connected to a speed control unit so that different parameters can be adjusted in dependence upon the operating state of the drying mill 3. The centrifugal disk is supported via an air bearing 34 which is arranged on the ground. The centrifugal disk 32, as described, is set in a high-speed rotational movement of several hundreds of revolutions per minute.

The raw material from the material inlet 31 reaches the centrifugal disk 32, and is stochastically distributed in different directions. Bodies (not shown) with impact edges are arranged on the centrifugal disk 32. The raw material comes into contact with the impact edges and in the process is pre-comminuted. The material which is gathered by the impact edges is forced into a rotational movement and centrifuged by the centrifugal disk 32. The material is moved tangentially outwards, and strikes an impact casing 35. The impact casing is arranged on a level with, and at a distance from, the centrifugal disk 32, in fact somewhat reduced by the height loss of the particles which is to be expected after centrifuging. As a result of the contact with the impact edges and the impingement on the impact casing 35, the raw material is broken, i.e. broken down into smaller particles. The centrifugal disk 32 can be constructed so that it has a disk-like basic structure with impact edges which are mounted upon an end face. Furthermore, it has a strainer basket 33 on its outer edge. The width of its openings is selected in such a way that foreign bodies and oversized particles, which could lead to damage of the impact casing 35, are held back. In an alternative exemplary embodiment, however, the centrifugal disk 32 can also be formed so that it has a cross-like basic structure 32' with raised bodies, which carry impact edges, on the respective ends of the arms of the cross. The particles which are centrifuged against the impact casing 35 fill the working chamber 30 in an almost homogenous manner. Caking and dead zones in the working chamber 30 can be reliably avoided in this way.

The propelling gas which is produced by the hot gas generator 41, is fed to the nozzle ring 45 which encompasses the centrifugal disk 32 and is arranged just beneath the centrifuging region of the centrifugal disk 32. The hot propelling gas (hot gas) rises through the interspace between the centrifugal disk 32 and the impact casing 35, and in the process picks up ground material in the form of broken particles. In the course of this, the gas stream, which is formed by the hot gas, fluidizes the comminuted particles, that is the ground material, thus transports it upwards into the upper region of the working chamber 30, and in the process dries it.

During this, moreover, calcining can already be started. This can be carried out when the temperature of the hot gas, the inflow velocity of which into the working chamber is regulated via the air gap of the nozzle ring 45, is between 400 and 700° C., preferably about 630° C., depending upon throughput of ground material. In addition, the admixing of hot gas is adjusted so that the ground material has an outlet temperature of 140 to 190° C., preferably 158° C. This temperature is sufficiently high in order to enable a continuation of calcining due to the characteristic temperature of the gypsum after leaving the drying mill 3. The energy input for the calcining process can be altogether reduced in this way. Furthermore, as a result of the better utilization of the characteristic energy when comminuting the raw material, the amount of energy which is required for subsequent cooling can be reduced.

When rising, unground and consequently oversized and excessively heavy particles cannot follow, and fall back downwards onto the centrifugal disk 32. The particles are gathered by the disk, and are again centrifuged against the impact casing 35. Therefore, a circulating process for the ground material takes place. Trials have shown that up to three repeats are to be expected. A spatial separation of the return passage is not necessary. By this construction, the invention enables a method implementation in which, thanks to the circulating, good comminution of the ground material is achieved with a simple construction, and calcination is also achieved with low energy input.

In FIG. 2, furthermore, an optional sifter 36 is shown. It is arranged directly above the centrifugal disk 32. The sifter can be static, or dynamic as in the exemplary embodiment which is shown. A drive (not shown) is provided for this. Via the rotational speed of the sifter 36, its separating mode between fine and coarse fraction can be influenced. A return passage 37 starts directly on the sifter 36. The return passage forms a defined path for return of the coarse fraction. It is constructed as a central passage and encompasses the material inlet 31. This achieves the effect of the ground material which is rejected by the sifter 36 together with the newly introduced material, being applied in a mixed state to the centrifugal disk 32. An annular interspace, which serves as a riser pipe for the fluidized particles, remains between return passage 37 and housing 39 of the drying mill 3. In this way, the paths upon which the comminuted particles from the centrifugal disk 32 by the impact casing 35 reach the sifter 36, or the coarse fraction from the sifter 36 gets back to the centrifugal disk 32, are separated from each other. The coarse fraction once more passes through the normal comminuting process, and repeats this in circulating operation as long as necessary. The idea of circulation which supports the invention is continued by this.

The particle volume, which is classified by the sifter 36 as fine fraction, is discharged from the drying mill 3 via a material outlet 38, and, as previously described, reaches the filtering plant 5 via the riser pipe 25. By means of the sifter 36, the retention time of the material in the working chamber 30 can be influenced in a simple and expedient manner. By increasing the rotational speed in the case of a dynamic sifter 36, the portion of the returned coarse fraction is increased. The retention time increases as a result. In this way, the reaction characteristic of the calcining process can be influenced.

The advantages of the drying mill and of its operating method, especially for calcining, are briefly summarized as follows: comminuting of the raw material is carried out by means of a centrifugal disk which is to be produced at little cost and which is to be operated in a low-wear and also energy-saving manner. An inner return of the comminuted material is provided. This improves the quality of comminution by means of evening out fluctuations of short duration, ensuring a satisfactory comminution, and better utilization of the characteristic energy for calcining. The energy consumption is consequently reduced. The calcining process is boosted by utilizing the thermal energy of the hot gas, which is fed to the drying mill into the working chamber by means of a nozzle ring which encompasses the centrifugal disk from the bottom, and by utilizing the retention time in the working chamber in an efficient manner.

The invention claimed is:

1. A drying mill for powdery or fine-grained material, with a housing which encloses a working chamber and in which a feed device for a propelling gas, which leads to a lower region, a comminuting device and a material inlet, are provided one above the other, which material inlet feeds the material from the top onto the comminuting device, wherein a material outlet leads outwards from an upper region of the working chamber, and a return passage leads downwards to the comminuting device, wherein the comminuting device is a centrifugal disk which rotates in a horizontal plane and interacts with an impact casing which is arranged on the housing on the inside, characterized in that a nozzle ring, which encompasses the centrifugal disk from the bottom, is provided for feeding propelling gas into the working chamber.

2. The drying mill as claimed in claim 1, characterized in that a drive motor for the centrifugal disk is arranged outside the working chamber.

3. The drying mill as claimed in claim 2, characterized in that the centrifugal disk is supported by an air bearing.

4. The drying mill as claimed in claim 2, characterized in that the impact casing is constructed in a multi-sectioned manner, with a plurality of exchangeable segments.

5. The drying mill as claimed in claim 1, characterized in that the centrifugal disk is supported by an air bearing.

6. The drying mill as claimed in claim 5, characterized in that the impact casing is constructed in a multi-sectioned manner, with a plurality of exchangeable segments.

7. The drying mill as claimed in claim 1, characterized in that the impact casing is constructed in a multi-sectioned manner, with a plurality of exchangeable segments.

8. The drying mill as claimed in claim 1, characterized in that a negative pressure connection is provided in order to charge the working chamber with negative pressure.

9. The drying mill as claimed in claim 1, characterized in that a hot gas generator is connected to the nozzle ring via a feed device.

10. The drying mill as claimed in claim 1, characterized in that the nozzle ring is provided with an adjustable air gap.

11. The drying mill as claimed in claim 1, characterized in that the centrifugal disc has a strainer basket on its edge.

12. The drying mill as claimed in claim 1, characterized in that a sifter, which separates a coarse fraction of material which rises from the centrifugal disk for return to the centrifugal disk, is arranged in the upper region of the working chamber.

13. The drying mill as claimed in claim 12, characterized in that a downwards pointing return passage is provided, through which the coarse fraction is transported by means of gravity force onto the centrifugal disk.

* * * * *